US010478735B2

(12) United States Patent
Harris et al.

(10) Patent No.: US 10,478,735 B2
(45) Date of Patent: Nov. 19, 2019

(54) VIDEO GAME SYSTEM WITH SPECTATOR MODE HUD

(71) Applicant: RIOT GAMES, INC., Los Angeles, CA (US)

(72) Inventors: Brett Harris, Los Angeles, CA (US); Carl Kwoh, Los Angeles, CA (US); Paul Sottosanti, Santa Monica, CA (US); Victor Keenan, Mill Valley, CA (US); George Skleres, Santa Monica, CA (US); Jason Cohen, Santa Monica, CA (US); Christina Norman, Los Angeles, CA (US); Brooks Bouchard, Marina del Rey, CA (US)

(73) Assignee: RIOT GAMES, INC., Los Angeles, CA (US)

( * ) Notice: Subject to any disclaimer, the term of this patent is extended or adjusted under 35 U.S.C. 154(b) by 17 days.

(21) Appl. No.: 15/847,616

(22) Filed: Dec. 19, 2017

(65) Prior Publication Data

US 2018/0361259 A1 Dec. 20, 2018

Related U.S. Application Data

(63) Continuation of application No. 15/220,272, filed on Jul. 26, 2016, now Pat. No. 9,878,252, which is a
(Continued)

(51) Int. Cl.
*A63F 13/00* (2014.01)
*A63F 13/86* (2014.01)
(Continued)

(52) U.S. Cl.
CPC .............. *A63F 13/86* (2014.09); *A63F 13/12* (2013.01); *A63F 13/35* (2014.09); *A63F 13/352* (2014.09);
(Continued)

(58) Field of Classification Search
CPC ........ A63F 13/12; A63F 13/53; A63F 13/537; A63F 13/5372; A63F 13/86
See application file for complete search history.

(56) References Cited

U.S. PATENT DOCUMENTS 6,699,127 B1 3/2004 Lobb et al.
6,999,083 B2 2/2006 Wong et al.
(Continued)

FOREIGN PATENT DOCUMENTS

WO WO 2013/163205 A1 10/2013
WO WO 2015/023564 A1 2/2015

OTHER PUBLICATIONS

WO, PCT/US2013/037827 ISR and Written Opinion, dated May 28, 2013.
(Continued)

*Primary Examiner* — Lawrence S Galka
(74) *Attorney, Agent, or Firm* — One LLP

(57) ABSTRACT

The field of the invention relates to multi-user online gaming systems, and more particularly to systems and methods that enable a spectator's experience for online active games. In an embodiment, an online multiuser game system includes an online game session server system communicatively coupled to a public network for access by a plurality of users to establish a plurality of real-time interactive games sessions. The online multiuser game system further includes a spectator server communicatively coupled to the online game session server system and configured to enable a user to view summary information of an active game session. In another embodiment, the spectator server enables the user to time shift the active game session and to view the summary information of the active game session. In another embodiment, the spectator server enables the user to view the
(Continued)

summary information of the active game session while the user is playing the active game session.

27 Claims, 15 Drawing Sheets

Related U.S. Application Data continuation of application No. 13/965,151, filed on Aug. 12, 2013, now Pat. No. 9,403,090, which is a continuation-in-part of application No. 13/457,337, filed on Apr. 26, 2012, now Pat. No. 8,636,589.

(51) Int. Cl.

| | | |
|---|---|---|
| *A63F 13/30* | (2014.01) | |
| *A63F 13/53* | (2014.01) | |
| *A63F 13/5372* | (2014.01) | |
| *A63F 13/537* | (2014.01) | |
| *H04N 21/478* | (2011.01) | |
| *A63F 13/497* | (2014.01) | |
| *A63F 13/358* | (2014.01) | |
| *A63F 13/822* | (2014.01) | |
| *A63F 13/35* | (2014.01) | |
| *A63F 13/352* | (2014.01) | |

(52) U.S. Cl.
CPC .......... *A63F 13/358* (2014.09); *A63F 13/497* (2014.09); *A63F 13/53* (2014.09); *A63F 13/537* (2014.09); *A63F 13/5372* (2014.09); *A63F 13/822* (2014.09); *H04N 21/4781* (2013.01)

(56) References Cited

U.S. PATENT DOCUMENTS

| | | |
|---|---|---|
| 7,458,894 B2 | 12/2008 | Danieli et al. |
| 7,632,186 B2 | 12/2009 | Spanton et al. |
| 8,485,899 B1 | 7/2013 | Rom et al. |
| 8,636,589 B2 | 1/2014 | Harris et al. |
| 9,403,090 B2 | 8/2016 | Harris et al. |
| 2003/0220143 A1 | 11/2003 | Shteyn et al. |
| 2007/0117635 A1 | 5/2007 | Spanton et al. |
| 2008/0119286 A1 | 5/2008 | Brunstetter et al. |
| 2008/0123226 A1 | 5/2008 | McGinn et al. |
| 2009/0125967 A1 | 5/2009 | Perlman et al. |
| 2009/0191969 A1 | 7/2009 | Moreno |
| 2009/0209348 A1 | 8/2009 | Roberts et al. |
| 2010/0035691 A1 | 2/2010 | Wild et al. |
| 2010/0304869 A1 | 12/2010 | Lee et al. |
| 2014/0004951 A1 | 1/2014 | Kern et al. |
| 2014/0031121 A1 | 1/2014 | Kern et al. |
| 2014/0038708 A1 | 2/2014 | Davison et al. |
| 2014/0038710 A1 | 2/2014 | Rudi et al. |
| 2014/0187317 A1 | 7/2014 | Kohler et al. |
| 2014/0228112 A1 | 8/2014 | Laakkonen et al. |
| 2014/0243082 A1 | 8/2014 | Harris et al. |
| 2014/0274368 A1 | 9/2014 | Cotter |

OTHER PUBLICATIONS

WO, PCT/US2014/050489 ISR and Written Opinion, dated Dec. 15, 2014.

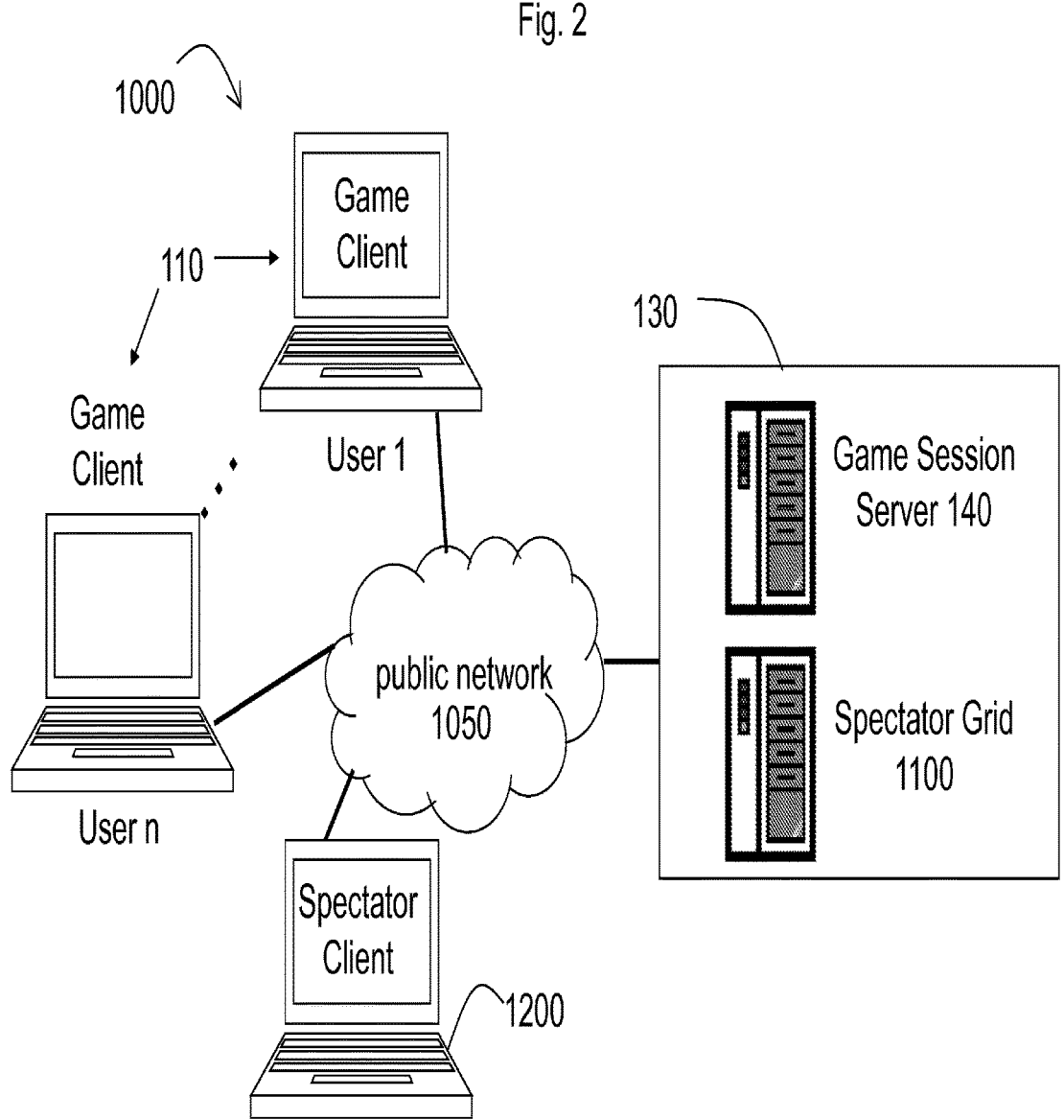

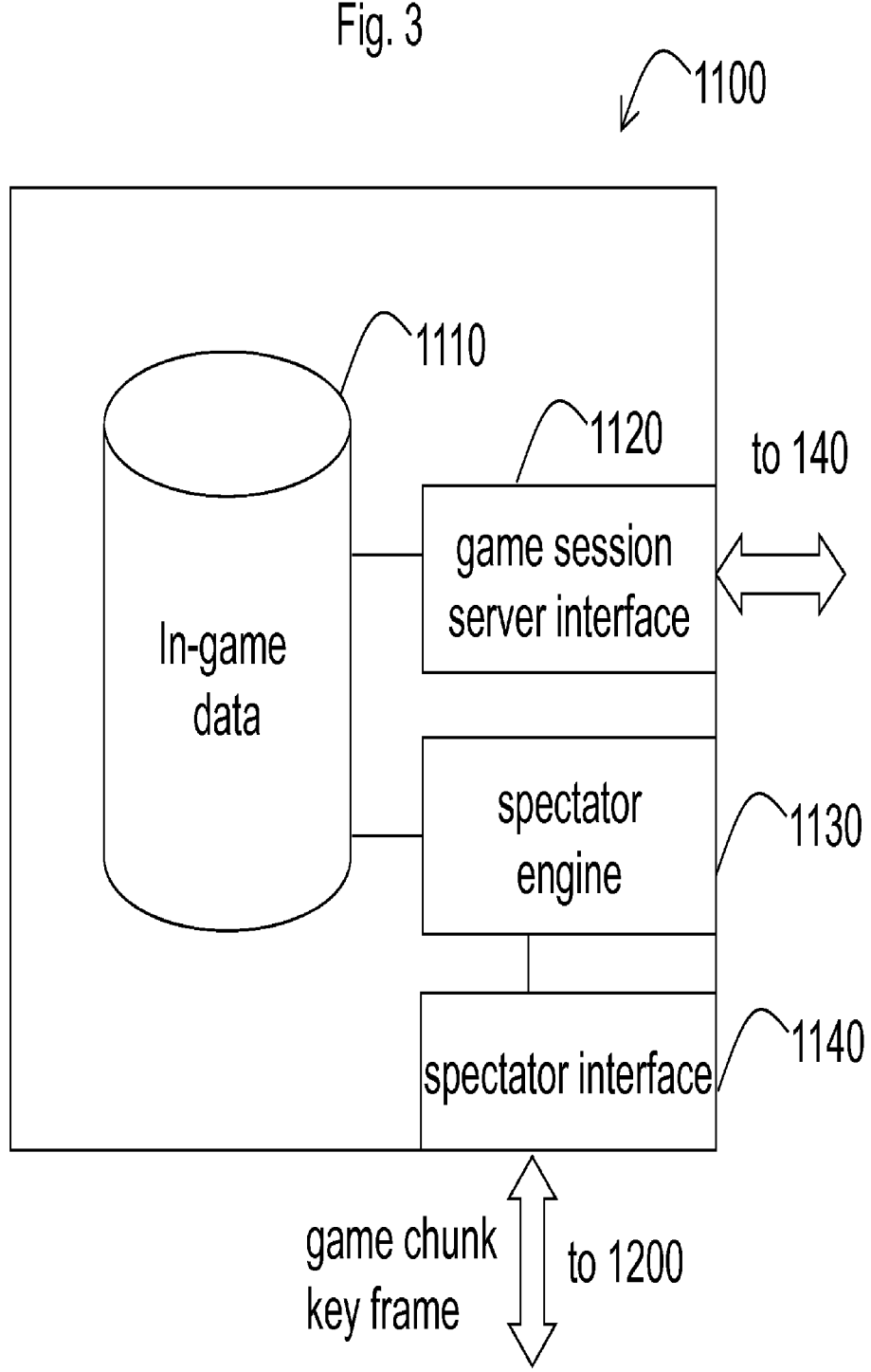

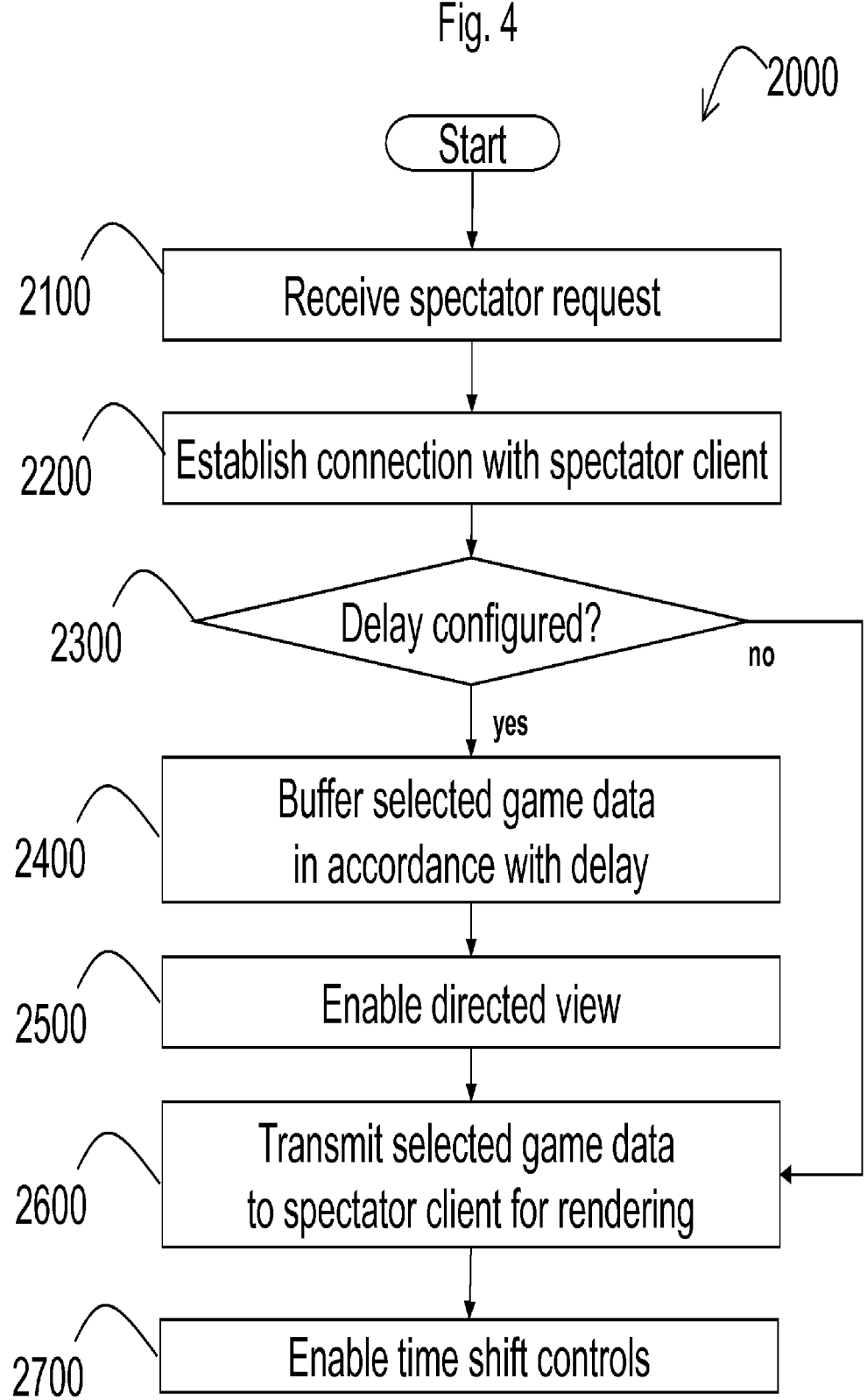

VIDEO GAME SYSTEM WITH SPECTATOR MODE HUD

CROSS-REFERENCED TO RELATED APPLICATIONS

This application is a continuation of U.S. patent application Ser. No. 15/220,272, filed Jul. 26, 2016, which is a continuation of U.S. patent application Ser. No. 13/965,151, filed Aug. 12, 2013, now U.S. Pat. No. 9,403,090, which is related to PCT Application No. PCT/US14/50489, filed on Aug. 11, 2014, and which is a continuation-in-part of U.S. patent application Ser. No. 13/457,337, filed Apr. 26, 2012, now U.S. Pat. No. 8,636,589, all of which are incorporated herein by reference in their entireties. This application claims priority to the above-referenced applications. This application is also related to U.S. patent application Ser. No. 14/150,083, filed Jan. 8, 2014, and PCT Application No. PCT/US13/37827, filed Apr. 23, 2013, both of which are incorporated herein by reference in their entireties.

FIELD OF THE INVENTION

The field of the invention relates to multi-user online gaming systems, and more particularly to systems and methods that enhance the experience of players and spectators for online active games.

BACKGROUND OF THE INVENTION

Like any popular competitive activity, such as football, basketball, card games and board games, multiuser online games have a large following of fans who appreciate competitive games and highly skilled players. Further, like with other games, such fans enjoy being spectators to highly competitive games or games that certain players are participating in. Further, there is a particular desire to witness these games live, particularly in organized tournaments. For example, in one popular multiplayer online game, League of Legends from Riot Games (www.leagueoflegends.com), from a base of millions of active users, there are a handful of players who have become famous for displaying exceptional skill and strategy. When these players engage in a game session, League of Legends enables other players to be spectators to the active game session. However, it would be desirable to improve the current spectator experience, for example, with an enhanced user interface. In addition, the players in the game session often need to view the information of the game play, for example, statuses and conditions of other players. Accordingly, systems and methods to enable an improved spectator's and player's experience would be desirable.

SUMMARY OF THE INVENTION

The field of the invention relates to multi-user online gaming systems, and more particularly to systems and methods that enhance the experience of players and spectators for online active games.

In an embodiment, an online multiuser game system includes an online game session server system communicatively coupled to a public network for access by a plurality of users to establish a plurality of real-time interactive games sessions. The online multiuser game system further includes a spectator server communicatively coupled to the online game session server system and configured to enable a user to view summary information of an active game session. In another embodiment, the spectator server enables the user to time shift the active game session and to view the summary information of the active game session. In another embodiment, the spectator server enables the user to view the summary information of the active game session while the user is playing the active game session.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 2 is an exemplary diagram of a multi-user online game system according to an embodiment of the present invention;

FIG. 3 is an exemplary diagram of a spectator grid according to an embodiment of the present invention;

FIG. 4 is an electronic process enabling a spectator experience for multiuser online games according to an embodiment of the present invention;

DETAILED DESCRIPTION OF THE PREFERRED EMBODIMENTS

State of the Art Systems

Figure 1A:
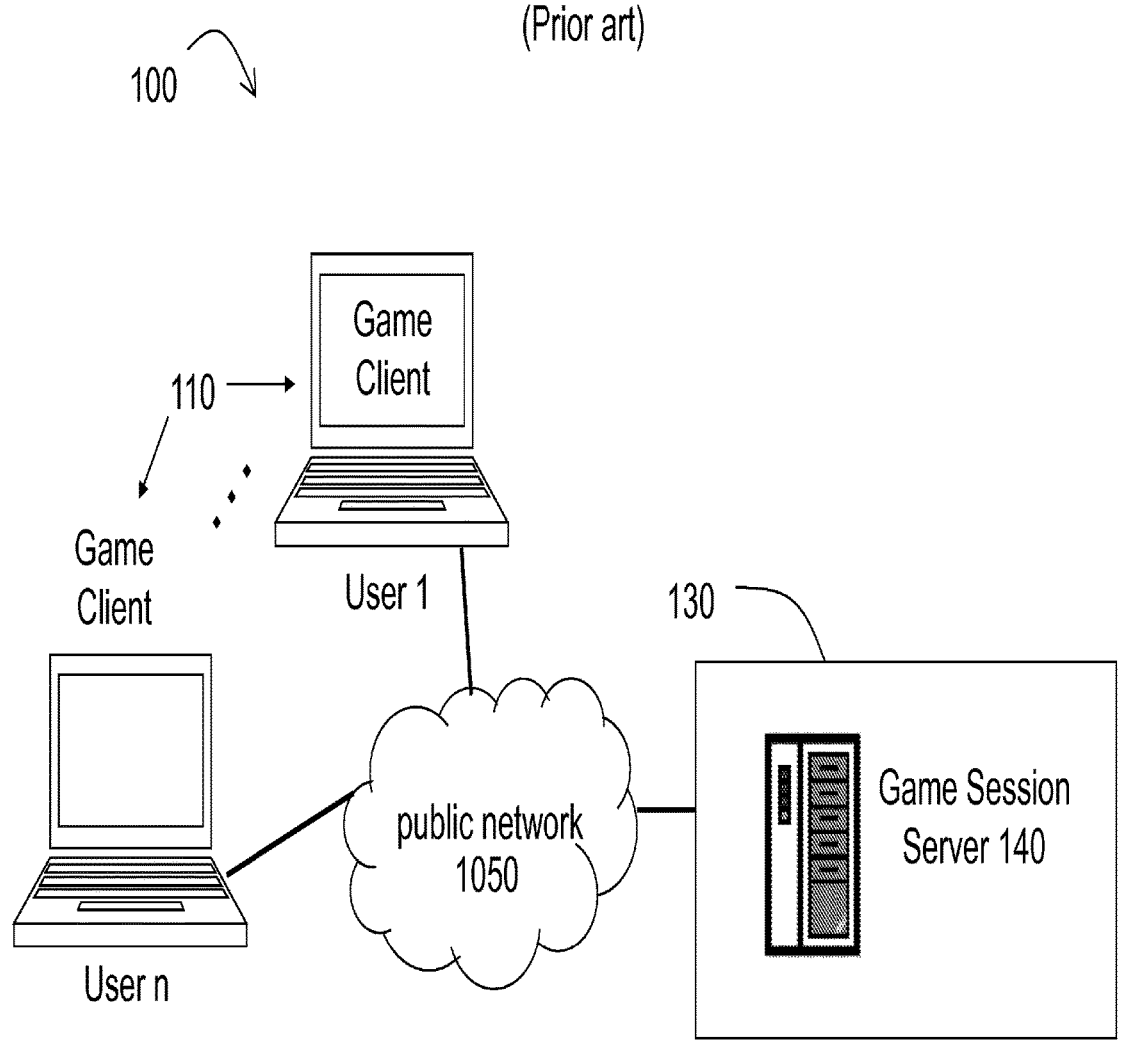
FIG. 1a is an exemplary diagram of a multiuser online game system known in the art.

Turning to FIG. 1a, a large multiuser online game system 100 over a public network 1050, such as the Internet, is shown. An example of such a game system 100 known in the art is League of Legends (www.leagueoflegends.com). League of Legends is a session-based, multiplayer online battle-arena game where rival teams compete against one another for victory on highly stylized battlefields and landscapes. Users can install a League of Legends game client on their personal computing device 110 to establish a game session over the public network 1050 with the game system's 100 datacenter 130, which provides the real-time online game interaction with the plurality of users 110.

Figure 1B:
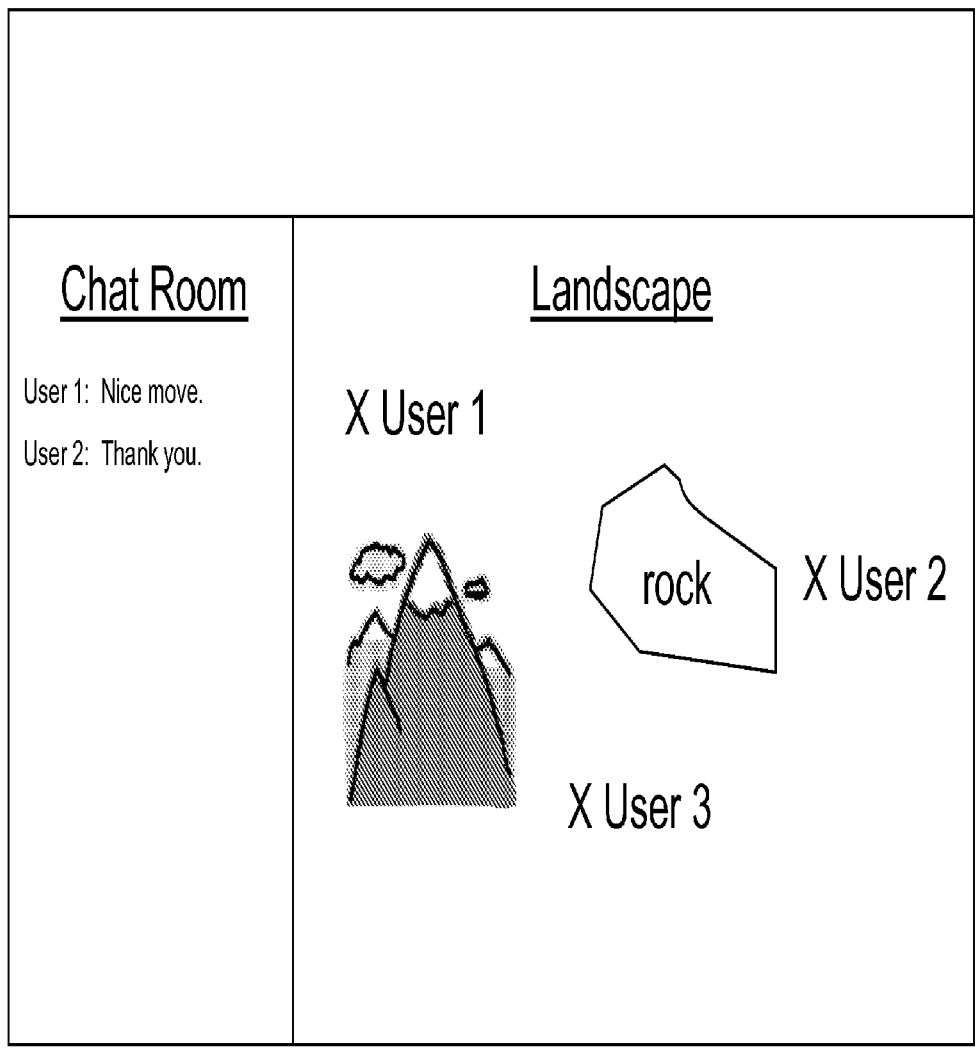
FIG. 1b is an exemplary user interface known in the art.

Turning to FIG. 1b, an example game client 110 user interface is shown. In online games such as League of Legends, each user is generally represented by a personalized graphical avatar in the user interface, also referred to as "champion," (shown as "X" in this example), and the game client 110 user interface may show the logical position of one user's avatar, X User 1, relative to another, X User 2 and X User 3 within a virtual landscape. The game client 110 user interface may also include a chat interface ("Chat Room") that enables participating users to communicate with one another beyond interactions with the avatars (Xs).

The datacenter 130 (FIG. 1a) includes a plurality of server systems operating on a plurality of server machines communicatively coupled to each other via the public network 1050 and/or a secure virtual private network (not shown). The server machines each includes one or more processors, memory, an operating system, one or more input/output interfaces and one or more network interfaces all known in the art. According to an embodiment, the datacenter 130 includes, among other things, a game session server system 140.

Figure 1C:
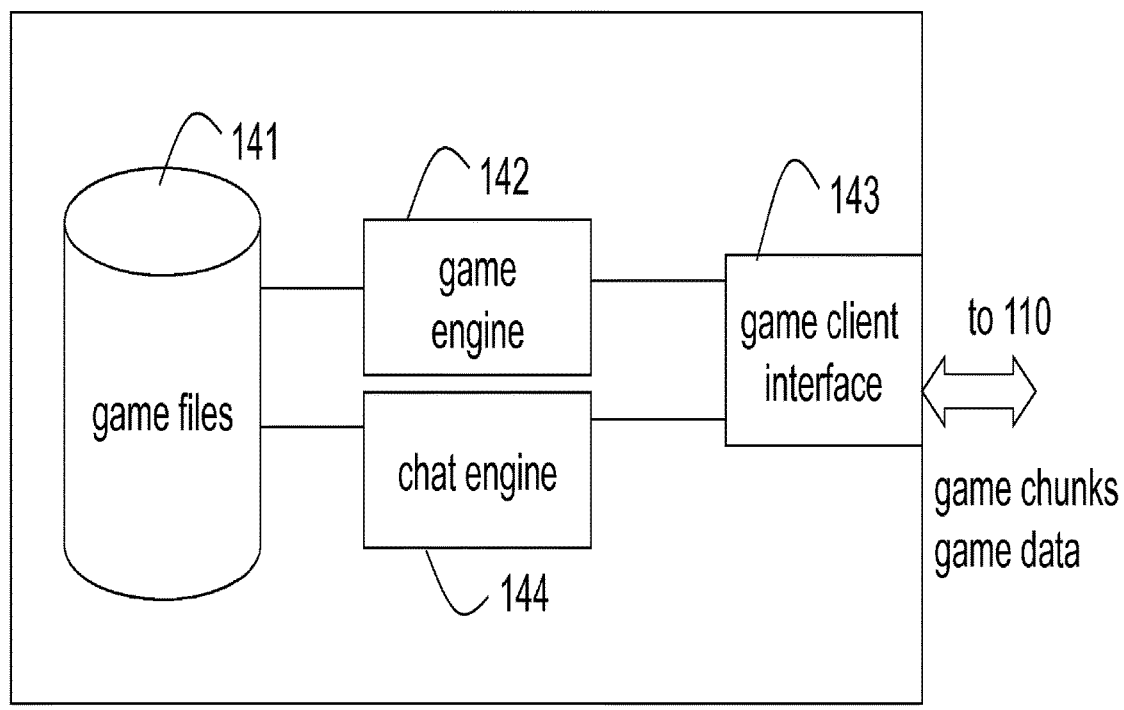
FIG. 1c is an exemplary diagram of a game session server known in the art.

Turning to FIG. 1c, a more detailed diagram of a game session server system 140 known in the art is shown. The game session server system 140 provides the game interaction with the users' game client 110 via the game client interface 143, which is generally an application interface known in the art accessible over the public network 1050 by the game client 110, e.g., in a traditional client server model. A game engine 142 coupled to the game client interface 143 is included to manage the interaction among the plurality of users 110, and between the plurality of users 110 and the game system 100. As one of ordinary skill in the art can appreciate, highly stylized user interfaces often contain graphics requiring large amounts of data. Transmitting such graphics over the public network 1050 may cause slow performance due to the limited available bandwidth of the public network 1050. One approach to address this is to have the graphics rendered by the game client on the user's computing device 110. To account for movements and changes to players in the game, only certain information is transmitted over the public network 1050 between the game clients 110 and the game engine 142, e.g., coordinates of various players within the landscape of the game.

Figure 1D:
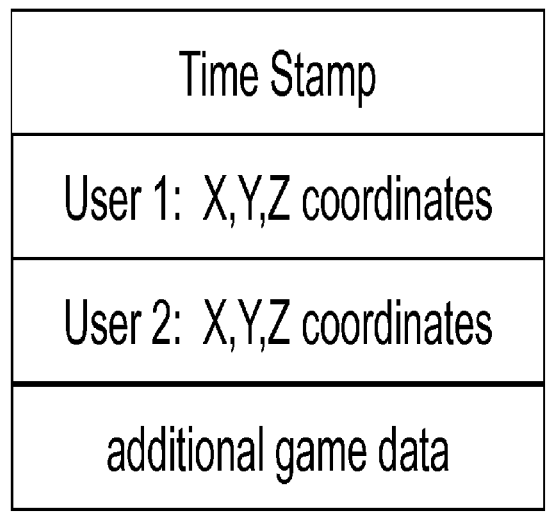
FIG. 1d is an exemplary diagram of a data packet known in the art.

Turning to FIG. 1d, such data can be transmitted efficiently in blocks of data packets collectively known as "chunks," an example format of which is shown in FIG. 1d. A chunk 150 generally includes the latest coordinates within the virtual landscape of certain users, a time stamp to enable the game engine 142 to synchronize data among players, and additional game data to facilitate rendering, such as weapons and powers that have been added or removed or other information to reflect the latest state of a player's avatar. A game client 110 will use the data in the chunk to render, among other things, the appropriate graphics and visual representations of the positioning of the avatars within the virtual landscape. If a user makes a change to its avatar state on its client 110, e.g., if the user moves its avatar or adds a power, one or more chunks 150 may be transmitted back to the game engine 142 to update the remaining players and to update rendering on the devices 110 of the remaining players. The chunk 150 enables responsive, high-performance real-time game play with highly stylized graphics over a public network 1050 of limited bandwidth since the graphics are rendered on the game client 110 and only limited data is transmitted for game interaction. In an embodiment, a chunk 150 for a particular user will not include all data for the game session but only data limited to the user's view. For example, turning to FIG. 1b, a rock or tree may hide another avatar in the virtual landscape from the first user's view. To maintain this context and competitive play, the hidden user's coordinates may not be included in the chunks sent to the first user until the hidden user is revealed during game play (e.g., the other user may move its hidden avatar into an opening unblocked by the rock or tree).

Turning back to FIG. 1c, the game session server system 140 further includes a chat engine 144 known in the art that enables the various users at game clients 110 participating in a particular game session to communicate with each other via text messages. Audio, pictures, and multimedia may also be exchanged with the chat engine 144. Both the game engine 142 interactions as well as the chat messages exchanged can be recorded and stored in a game files database 141. This enables, among other things, replay and history analysis by not only the users but also the administrator and other systems as will be described below.

Preferred Systems

Turning to FIG. 2, an online multi-user game system 1000 according to an embodiment of the present invention is shown. The system 1000 provides an enhanced player and spectator experience as will be described below. The system 1000 includes a datacenter 130 having a game session server system 140 as described above. The system 1000 also includes game clients 110 configured to access data center 130 over the public network as described above. According to an embodiment, the system 1000 further includes a spectator grid 1100 operatively coupled to the game session server system 140 that enables a user with a spectator client 1200 to access the data center 130 and select an active game session to view as a spectator. The spectator grid 1100 is also implemented as a server system. The spectator client 1200 includes a similar graphics rendering application as the game client 110 but with no ability to actively participate in the selected game.

Turning to FIG. 3, a detailed diagram of a spectator grid 1100 is shown. The spectator grid includes an in-game database 1110 that is configured to receive game data, e.g., game chunks 150, from the game session server system 140 via a game session server interface 1120. These game chunks 150 may include global data, e.g., positioning coordinates for avatars whether hidden or not, within the virtual landscape of a game session. The in-game database 1110 may utilize an in-memory coherence cache, thereby enabling faster querying of the database 1110 in real time. The spectator grid 1100 further includes a spectator engine 1130 configured to interface with spectator clients 1200 via a spectator interface 1140 and provide game data to the spectator clients 1200 from the in-game database 1110.

Preferred Processes

Figure 5:
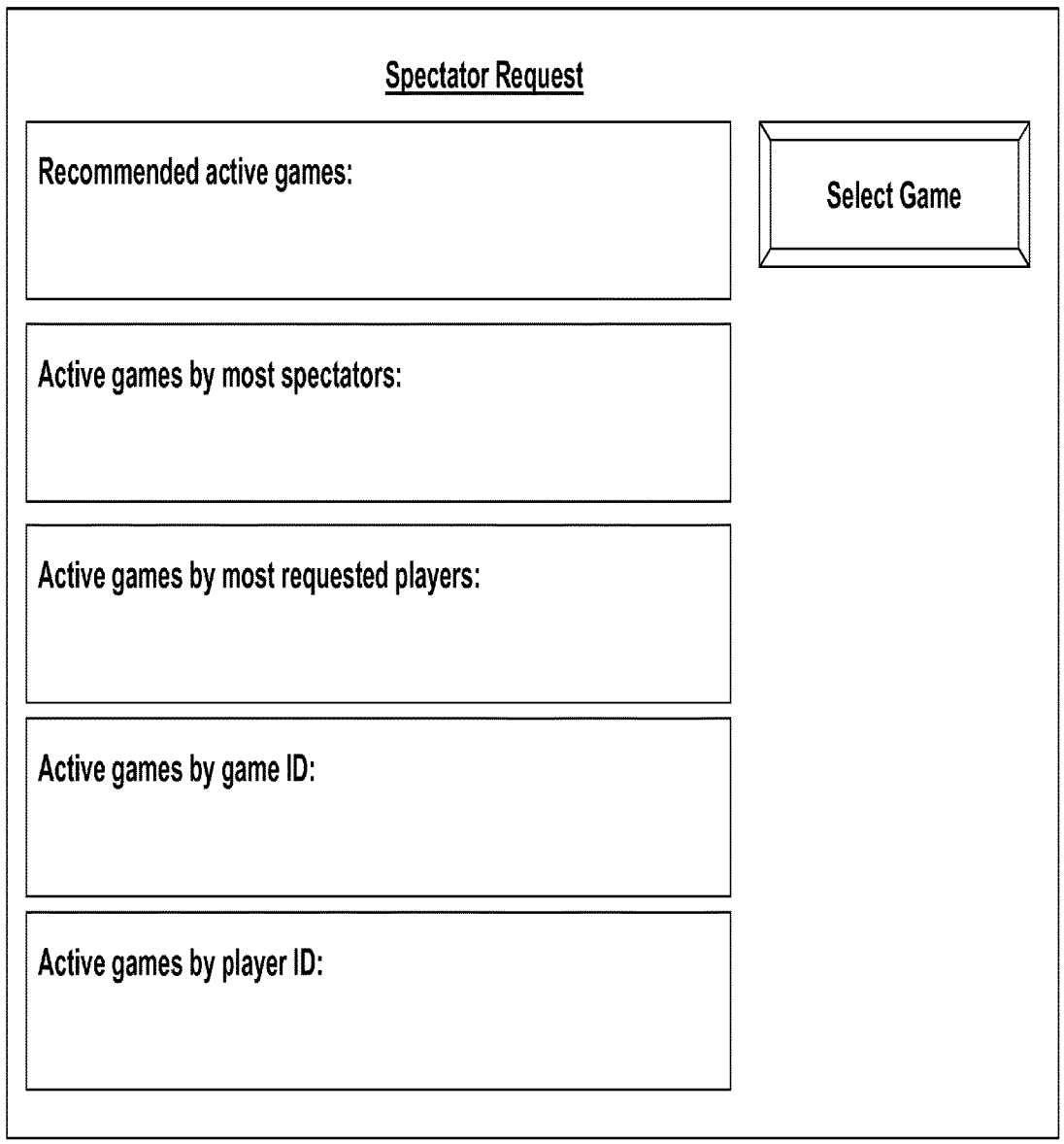
FIG. 5 is a user interface according to an embodiment of the present invention.

Turning to FIG. 4, a process 2000 according to an embodiment is shown. As mentioned above, fans of certain multi-user online games may wish to be spectators of particular active games, as with any competitive game. To address this need, the game system 1000 enables a user to view active game sessions within the system 1000. Turning to FIG. 5, an exemplary interface for a spectator client 1200 is shown. When a user connects to the data center 130, one or more lists of active games are provided. They can be grouped into a variety of categories, including, active games having the most spectators, active games played by most requested players, i.e., players that most spectators have requested viewing of, e.g., players known as having exceptional skills. The data that enable these lists can be tracked and deduced by previous spectators' selections, which can be stored in the database 1110 of the spectator grid 1100. Games can also be presented by specific game identification and/or player identification (regardless of whether such a player is well-known). Moreover, the game system 1000, e.g., the spectator grid 1100, can monitor certain activities within an active game. For example, the spectator grid 1100 can monitor for games having scores that are very competitive, for games that have a particularly high number of known or higher tiered champions, for players that are playing at a particularly high level, and/or for players that are demonstrating particularly unusual and/or entertainment techniques or moves. The spectator grid 1100 can identify such games as recommended games for potential spectators. Games can also be listed in random order. Games can also be listed by particular events, e.g., an organized tournament.

Figure 6:
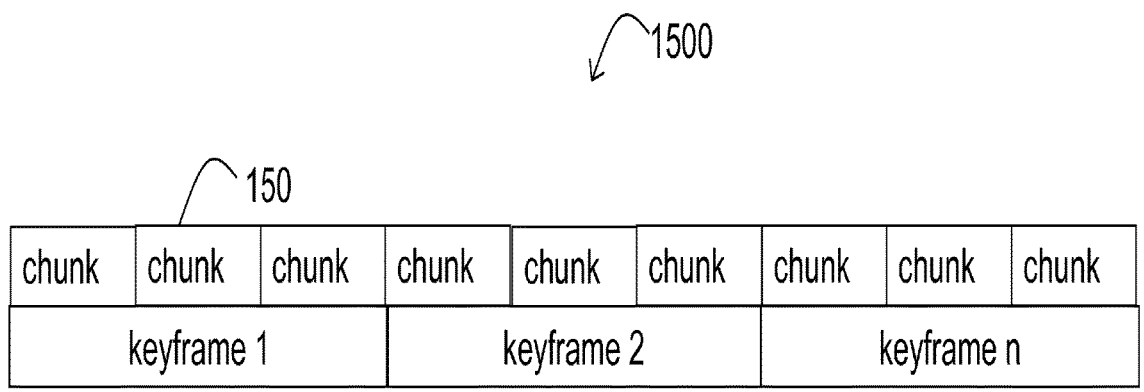
FIG. 6 is a data packet according to an embodiment of the present invention.

Turning back to FIG. 4, once a spectator has selected a particular active game to view, the spectator grid 1100 receives the request (Action Block 2100) and establishes a data connection with the spectator's client 1200 (Action Block 2200) to transmit game data to the client 1200 in streaming fashion (Action Block 2600) to be rendered on the spectator client 1200 in real-time or near real-time to the selected active game. Turning to FIG. 6, an example format 1500 is shown for game data transmitted by the spectator grid 1100 to the spectator client 1200. What is shown, in an embodiment, is that game chunks 150 are sent to the spectator client 1200 with similar structure and content to the game chunks 150 sent to game clients 110. One difference in this embodiment is that the game chunks 150 sent to the spectator client 1200 includes complete data for the active game being viewed. For example, all player positions are provided, including the ones that are hidden, so that the spectator is provided an omnipresent view.

Once the chunks 150 are received, the spectator client 1200 can generate the same graphics and visual representations of the active game in real-time or near real time of the active game.

Also included in the data format 1500 are keyframes, which are effectively snapshots of a particular game at a particular point in time. A keyframe is aligned with a fixed group of chunks 150, e.g., 3, to define a time interval using the time stamps in the chunks 150. A keyframe can be generated by creating a chunk 150 that includes game data packets for all players that exist at a given time. When a keyframe is loaded onto a spectator client 1200, then the latest game data, e.g. the latest scene, along with all of the entity data that are known by the spectator client 1200 at that time, e.g., avatar and computer controlled object data, are deleted. The keyframe can then be played back as a regular chunk 150, which renders the entity data that exist at that point in time at their correct positions. The chunk 150 that corresponds to the keyframe's point in time is then loaded as the next chunk to render. From there, chunks 150 can be rendered in chronological order. The amount of game play time represented by a chunk 150 is configurable by the system's 1000 administrator, for example, approximately 30 seconds.

One aspect of the keyframes is the enablement of time-shifting features for the live game (Action Block 2700). For instance, an active game session rendered from the chunks 150 at a previous point of time can be quickly simulated by jumping to specific keyframes instead of individual chunks 150. In an embodiment, when jumping to specific keyframes, much of the game processing can be disabled, such as rendering and sound, to enable faster jumps. Once a keyframe is reached, then normal playback and rendering is enabled, as described above.

Figure 7:
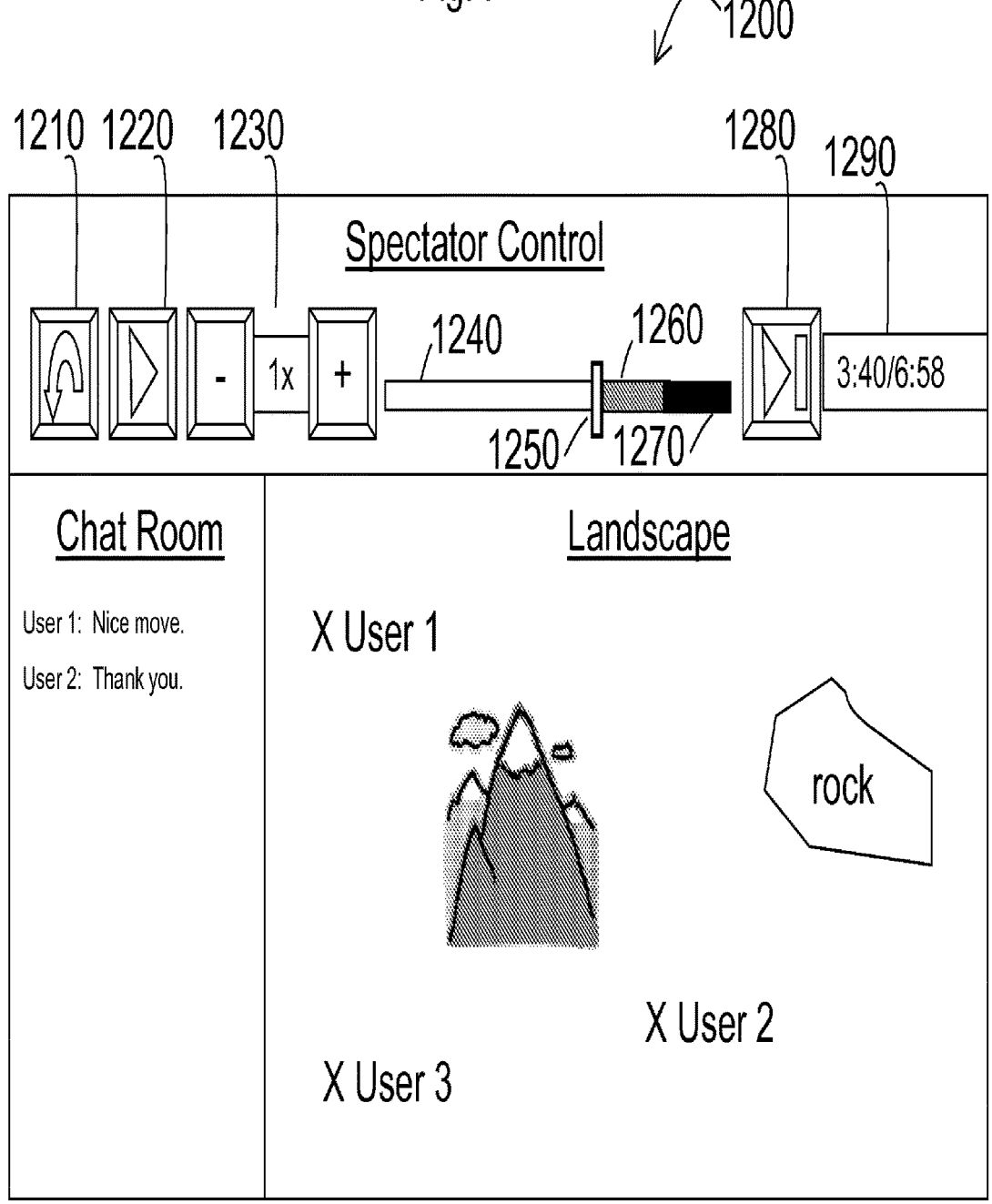
FIG. 7 is a user interface according to an embodiment of the present invention.

Turning to FIG. 7, to illustrate exemplary time shifting controls enabled by the system 1000 (Action Block 2700), a user interface for a spectator client 1200 viewing an active game session is shown. As mentioned above, the chunks 150 enable the spectator client 1200 to render real-time, or in near real-time fashion, game play from an active game, but with an omnipresent view that enables the spectator to view all game play within the virtual landscape. Moreover, certain time-shifting controls can be enabled. The following are examples.

Jump Back 1210—This button allows the spectator to jump back a fixed amount of time, similar to an "instant replay" feature. In this case, the spectator client 1200 can jump to the keyframe of the requested point in time, and render the associated game chunks 150 as described above.

Play/Pause 1220—This button will pause the game if it is playing, or play the active game session from the specific point in time where it was last paused, if it is paused.

Playback Speed 1230—The "+" and "−" buttons will increase and decrease the speed that the game is playing at, respectively, and the playback speed "1×" can be displayed. The use of keyframes may be particularly helpful in performance of this feature, as described above.

Time control scrubber bar 1240—this area represents the time that is in the past for the game. It can be clicked on to set the time back to an earlier time. A tooltip that shows what time the user will jump to when hovering over this bar can be included (not shown).

Time control scrubber position 1250—This is the current point in time that is being played.

Viewed time 1260—This area of the bar indicates time that is in the future that is before the latest point in time that the user has already seen. It can be clicked on to jump to a point in time in the future.

Unviewed time 1270—This area indicates the period of time that is available to jump to but that the user has not seen yet. This time can also be clicked.

Jump to latest 1280—This button, when pressed, will jump to the latest point of time that the user has viewed, as indicated by the highlighted position at the end of 1260. If the user is already playing back from this point, it will move the user to the latest point in time available, at the end of 1270.

The display at 1290 indicates the current point in time that the user is watching and the maximum available time that the user can access, respectively.

In addition to the controls above, a spectator may select any area of the virtual landscape, which can be expansive, to view at any time, and can further select a particular player for the camera view to automatically follow. For instance, the spectator can mouse click on a particular player in the game, and the spectator's camera view can follow that player automatically. This can be achieved by having the spectator client 1200 focus on that player's data within the received chunks 150, either real-time, or at a selected time. Further, the spectator can switch from player to player at any time.

Turning back to FIG. 4, because the spectator's view is omnipresent, a player may be able to use that spectator's view to its advantage to obtain additional information about other players in the game. To prevent this, a delay may be configured (Decision Block 2300). If configured, then the spectator grid 1100 may buffer the chunks by a certain amount of time, e.g., 30 seconds, before transmitting such data to a spectator, thereby enabling a delay, which would remove the incentive for an active player to attempt to view the game in spectator mode.

Moreover, the delay enables the spectator grid 1100 and/or spectator client 1200 to analyze the most recent data and notify the spectator of upcoming events that may be of interest to the spectator. For instance, the virtual landscape of a game may be too large to view in detail in its entirety on a spectator client's 1200 screen, and the various avatars may be moving in any different direction. At any given moment, an event could occur, such as a special move or a special achievement outside the spectator's current camera view. Example events include champion defeats, champion damage, events that lead up to champion defeat and/or damage, and game specific events such as the completion of important team-based objectives, and status of key objects within the game, such as status of key computer controlled avatars or objects. To maintain focus on the key events, the spectator grid 1100 and/or spectator client 1200 can be configured to monitor for such activities within the buffer (which occur on the spectator's client 1200 at a configurable time later, e.g., 30 seconds) and cause the spectator's view to focus on those specific activities when they develop and/or occur on the spectator's client 1200. This directed view (Action Block 2500) will ensure that the spectator does not miss key events as they unfold.

Figure 8:
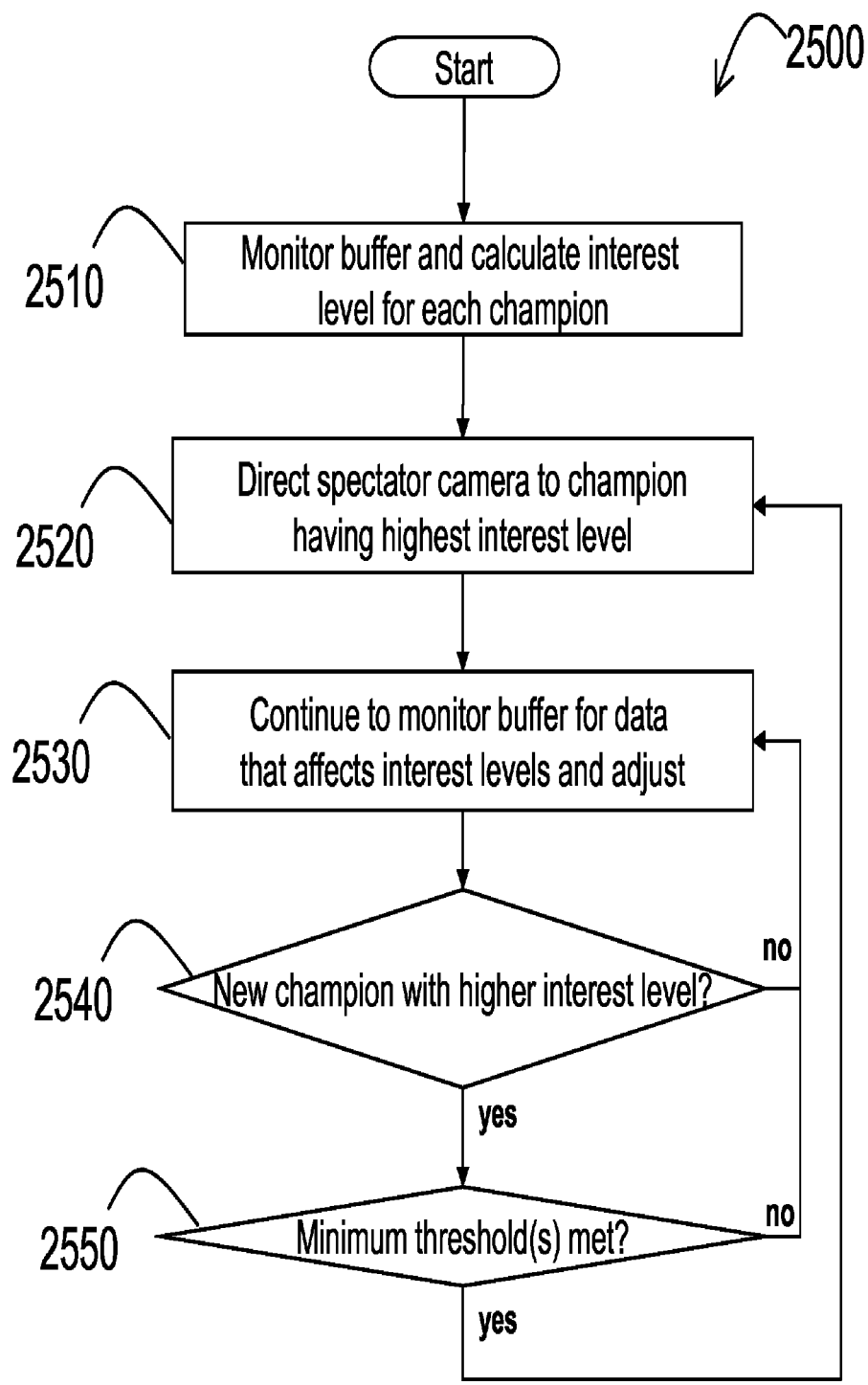
FIG. 8 is an electronic process directed towards a directed spectator view according to an embodiment of the present invention.

Turning to FIG. 8, a more detailed illustration of a directed view process (Action Block 2500) is shown. In general, one approach to ensure that a spectator's view (e.g., as shown in FIG. 7) is focused on key activities and events within an active game is to follow one or more champions that are associated with those events and activities. Which champion to follow can be dictated by a calculated "interest level" for each champion. Generally, a champion's interest level correlates with the distance between that champion and the key activities and events described above when they occur and/or as they develop. In League of Legends, factors used to calculate a champion's interest level include, for example: proximity of other champions within the virtual landscape; current health level; presence of debuffs (i.e., an effect given to a champion that decreases performance); participating in future events like damaging and/or defeating other champions or important team objectives; interaction with terrain elements, champion activities like stealthing and recalling to base, and so on.

In an embodiment, the buffered data from Action Block 2400 is monitored (e.g., in 10 second increments) for data, such as that described above, to calculate an interest level for each champion within an active game (Action Block 2510).

The spectator grid 1100 and/or spectator client 1200 then directs the spectator client's 1200 view to follow the champion having the highest interest level (Action Block 2520). The view is adjusted to also encompass nearby champions as well, to provide as full view of the activities as possible. The spectator grid 1100 and/or spectator client 1200 then continues to monitor the most current buffer for data that affects the interest level calculations (Action Block 2530).

If activities develop during the game that cause another champion to have a higher interest level, then the spectator grid 1100 and/or spectator client 1200 may shift the spectator client's 1200 view to the new champion. However, if the identity of the champion with the highest interest level shifts frequently, it may not be desirable to have the spectator client's view 1200 shift at the same frequency. To address this, hysteresis may be incorporated. For instance, if a new champion gains status as having the highest interest level (Decision Block 2540), then additional thresholds are evaluated to assess whether to shift the spectator client's 1200 view (Decision Block 2550).

A number of threshold values may be utilized. For instance, even if a new champion gains status as having highest interest level, a spectator client's 1200 view may not adjust until the new champion's interest level is a certain percentage higher over the interest level of the previous champion with the highest interest level (e.g., 20%). Another threshold is a fixed value that the interest level of the new champion must exceed. These thresholds may decay over time after each shift in view and eventually settle at a minimum value until the next shift in view.

These thresholds, in combination with the interest for important future events ramping up linearly, ensure that the camera will switch early and provide a lot of context to an event during periods of low interest elsewhere in the virtual landscape. When there are high levels of activity occurring in other locations, the shift may not occur until just a few seconds before the upcoming important event occurs to ensure that the spectator client's 1200 view captures all key events properly.

Figure 9:
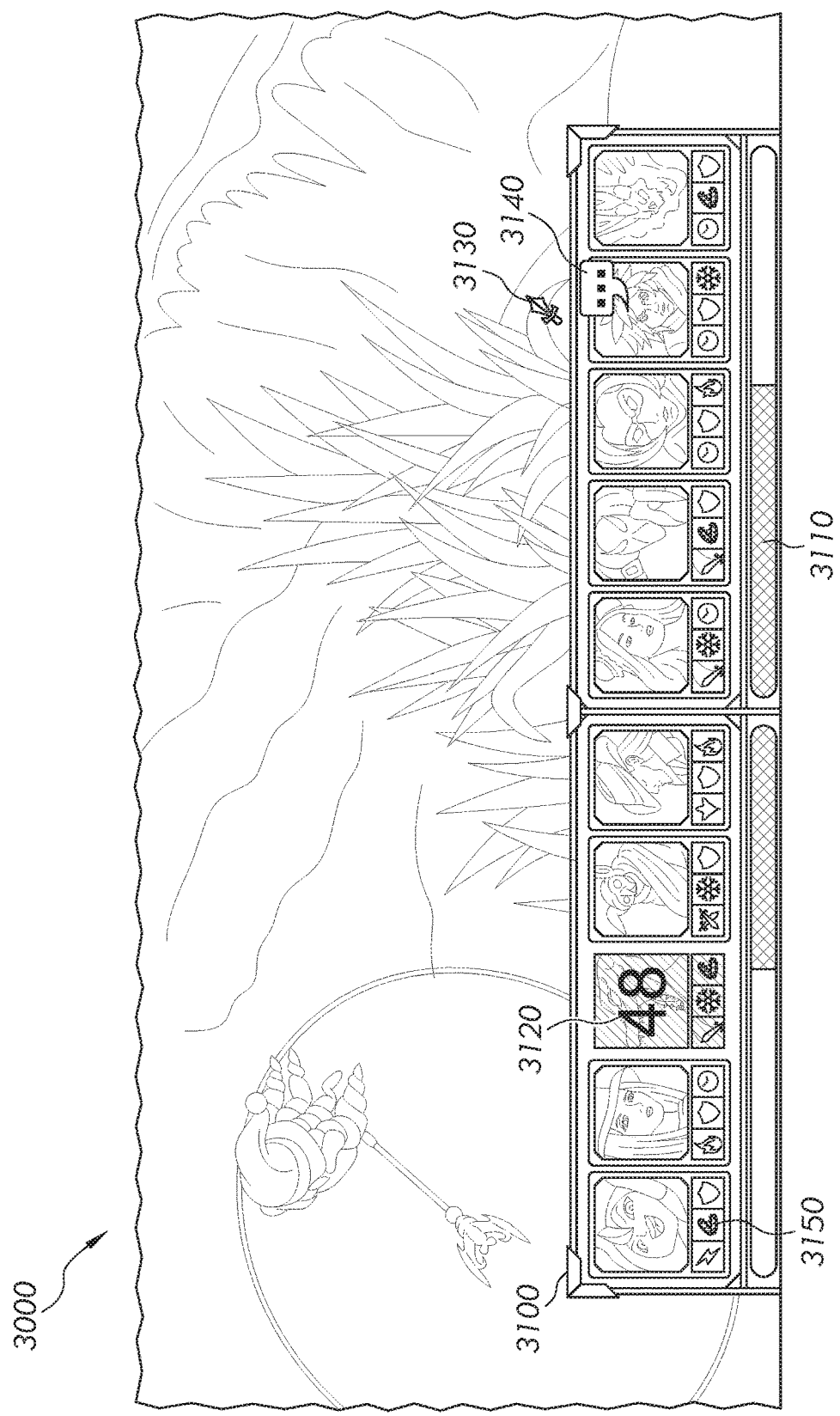
FIG. 9 is another user interface according to an embodiment of the present invention.

Turning to FIG. 9, another exemplary user interface 3000 for a spectator client 1200 viewing an active game session is shown. As described above, the chunks 150 enable the spectator client 1200 to render real-time, or in near real-time fashion, game play from an active game, but with an omnipresent view that enables the spectator to view all game play within the virtual landscape. Having the omnipresent view of the game session, the spectator client 1200 may display a team status (or team fight) bar 3100. The ability to display the status bar 3100 may be configurable by an administrator of the system 1000. For example, the administrator may enable viewing of the status bar 3100 only for the game broadcaster (or commentator), or for one or more game spectators (in the latter situation, the game broadcaster and other game spectators may see the same status bar 3100. The description herein thus refers to spectator as both game broadcaster and game spectators, unless otherwise indicated). The administrator may also enable the status bar 3100 to be displayed automatically as a default, not to be displayed as a default, or to be displayed only during directed camera mode as a default. The status bar 3100 may be displayed with or without the shifting controls (shown in FIG. 7).

The status bar 3100 displays certain summary information of each champion of each team, e.g., of all 10 champions in a 5×5 game session, showing the champions of a team in a group (e.g., on the left) and the champions of the opposing team in another group (e.g., on the right). The status bar 3100 helps the spectator quickly follow and understand the game session, or helps the spectator understand certain information without the help of a game broadcaster, who (if present) may want to focus on other aspects of the game session. In an embodiment, the spectator may manually toggle, e.g., by pressing a key or combination of keys, the display of the status bar 3100 on or off. Or the spectator may disable and enable one or more information display in the status bar 3110. The information displayed in the status bar 3100 may include, for example:

Team Health bars 3110—This information helps the spectator see which team is winning and aggregates the health of the champions and/or units into a single representation. The team health bar 3110 may be calculated proportionally, i.e., high-health champions or units represent a greater proportion of the team health bar over low-health champions. Or the team health bar 3110 may be scaled so low and high health champions represent an equal proportion of the health bar 3110. This will help the health bar fulfill its core role of communicating who is winning in team fights.

Death Timer 3120—This information helps the spectator see which champion is dead and the associated death timer, which when reaches zero the champion is revived.

Pentakill Counter 3130—This information helps the spectator see which champion or unit is making kills.

Loss of Control icon 3140—This information helps the spectator see the stuns and other powerful hard-to-read effects on a champion or unit.

Ultimate/Summoner Spell Status 3150—This information helps the spectator understand high-power, high-cooldown plays. The Spell status 3150 may pulse when the ultimate/summoner spell is activated.

Another example of information that may be displayed in the status bar include the aggregate number of units and/or the number of units that were in the spectator's field of view that have been destroyed within a predetermined period of time. For example, if there were 100 tank units in the spectator's field of view initially, then 10 units were destroyed in a predetermined time period, the loss of 10 of those units may be identified. If combinations of distinct unit types have unique abilities that are only available when the distinct unit types are within a predetermined proximity, the availability of these unique abilities may be displayed as well. For example, if a repair unit has a special "tank repair" ability that is only available when in proximity to a tank unit, such ability may be displayed when the repair unit and the tank unit are within the predetermined proximity.

Figure 10:
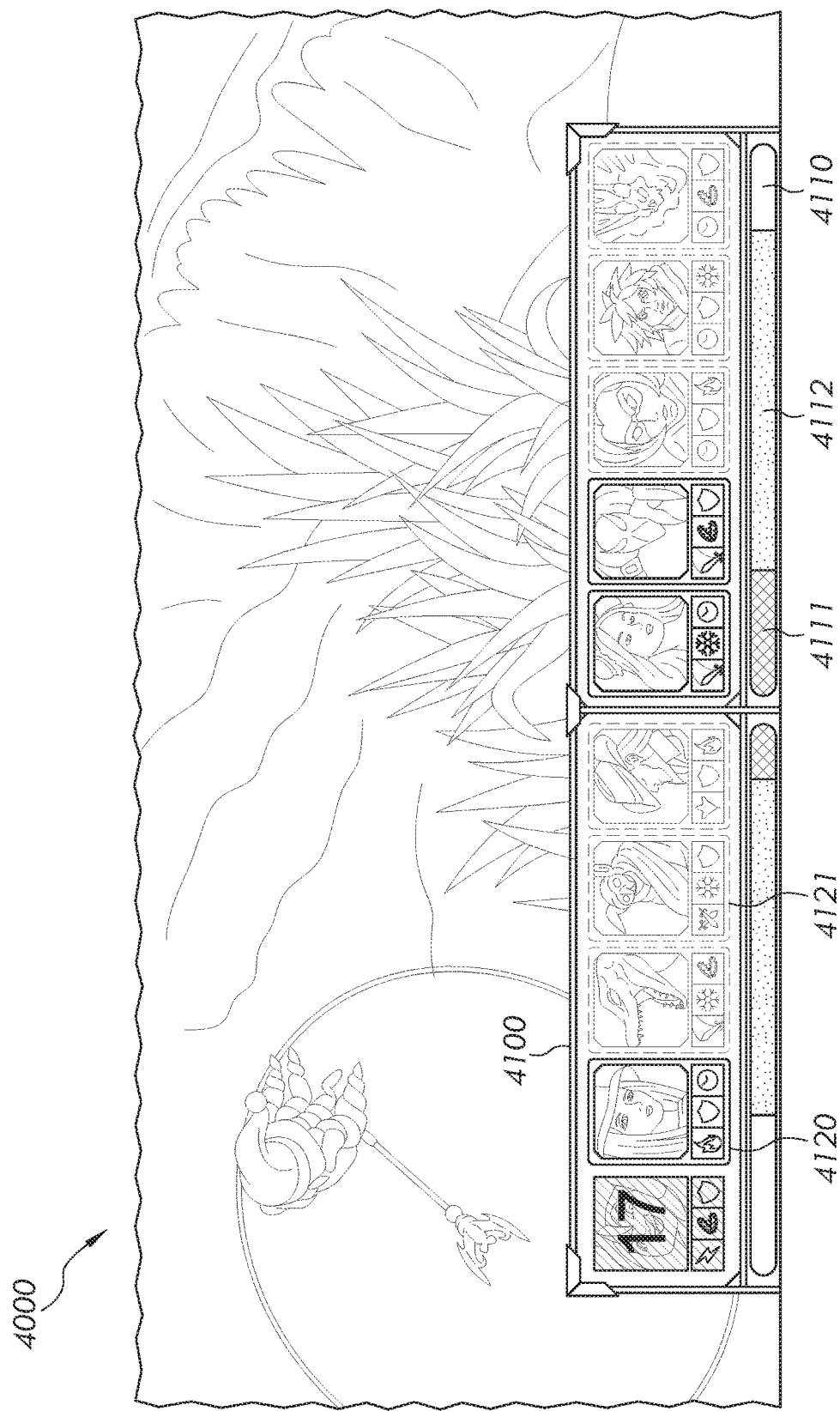
FIG. 10 is another user interface according to an embodiment of the present invention.

Turning to FIG. 10, another exemplary user interface 4000 for a spectator client 1200 viewing an active game session is shown. In the user interface 4000, the spectator client 1200 displays a team status (or laning status) bar 4100. The status bar 4100 includes information as shown in the status bar 3100 above, for example, Death Timer 3120, Spell Status 3150, and so on. In addition, the Health bars 4110 further differentiates the health 4111 of champions that are nearer to the spectator client's 1200 view, and the health 4112 of champions that are farther from the spectator client's 1200 view, e.g., by showing brighter versus darker shades respectively. The threshold definition of near versus far may be configurable by the administrator of the system 1000, or by the spectator, as will be described in more detail below. The display of each champion in the status bar 4100 also differentiates near champions and far champions. For example, a near champion 4120 has a brighter display and/or a different border, e.g., a silver border. The far champion 4121 has a darker display and/or border.

Figure 11:
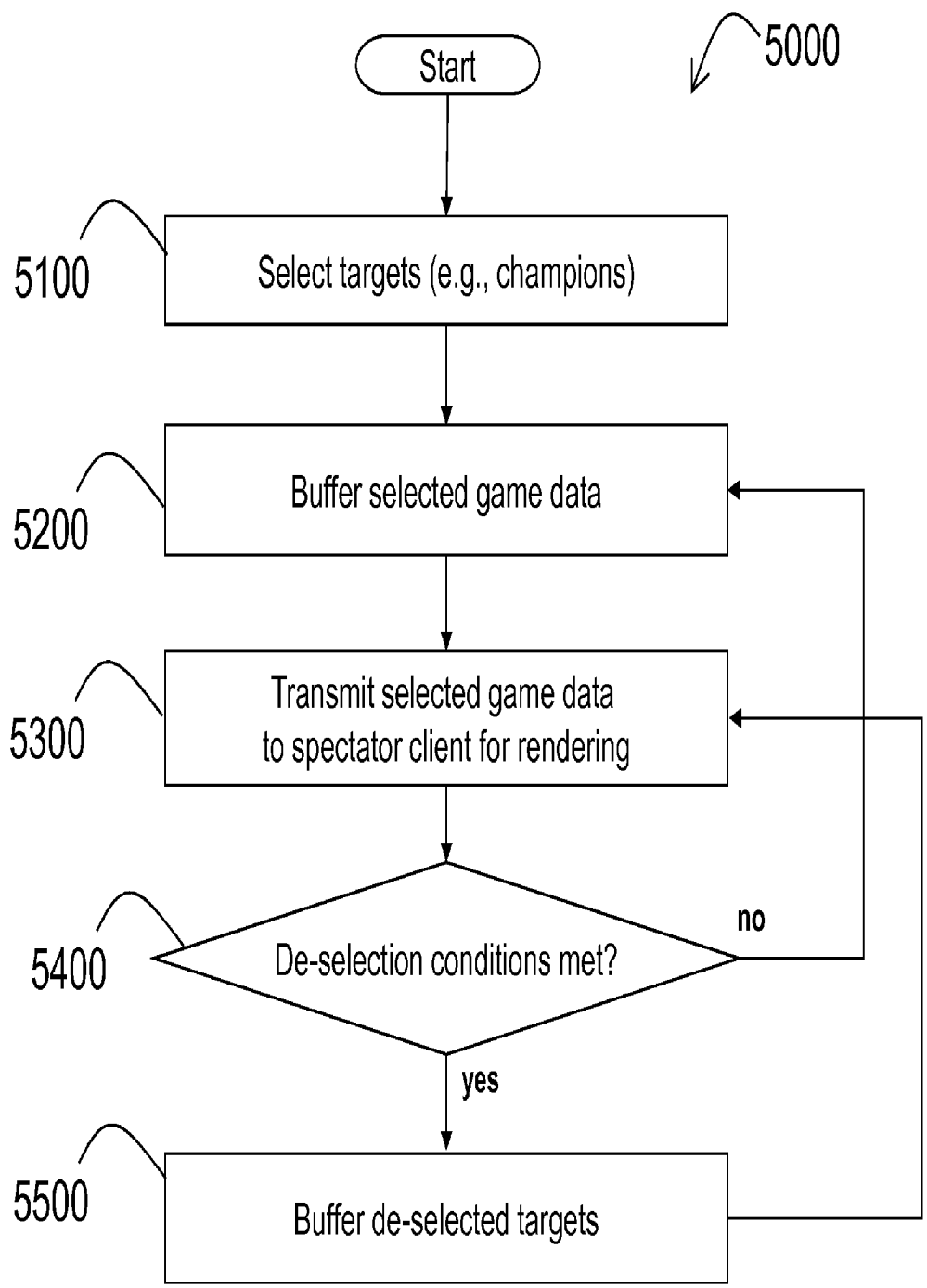
FIG. 11 is another electronic process directed towards a directed spectator view according to an embodiment of the present invention.

Turning to FIG. 11, another illustration of a directed view process (Action Block 2500) is shown. The system 1000 may automatically set the conditions and criteria for information to be displayed by the spectator client 1200. The conditions and criteria may also be configured by the administrator, and may also change during a game session. For example, certain conditions and/or criteria during a game session may trigger the spectator client 1200 to display the status bar 3100, 4100, e.g., changing from a global view to a view including the status bar 3100, 4100. The conditions include, for example, number of champions (e.g., 6 of 10) within a certain area of the virtual landscape, abilities used, champions being targeted, damage done to champions, and so on.

The system 1000 may also define conditions and/or criteria for including or excluding certain champions, or for including or excluding information of certain champions in the status bar 3100, 4100. These conditions and criteria include, but are not limited to, selection of multiple targets (e.g., champions) based on visibility, and de-selection of multiple targets (e.g., champions) based on visibility.

Selection of multiple targets based on visibility—The system 1000 may select to display multiple entities, e.g., champions, based on visibility status (Action Block 5100). This selection may produce a list of targets of interest. The criteria for such selection may include, but are not limited to:

The target is currently visible.

Visibility+range: The target is visible or would be visible if it were moved a pre-determined distance towards the nearest point on the border of the visible range or a pre-determined distance from the center of the visual range.

Visibility−range: The target is visible and would be visible if it were moved a pre-determined distance towards the nearest point on the border of the visible range or a pre-determined distance from the center of the visual range.

Wounded: The targets are not at full health.

In-Combat: Only targets that have caused damage to an enemy, or received damage from an enemy, within a recently defined time period.

Attacking: Only targets that are currently considered to be attacking, for example, targets that have fired a shot or used an offensive ability that is targeted at an enemy.

Two or more of the above criteria may be simultaneously selected.

De-selection of multiple targets based on visibility—Having a list of selected targets for display (Action Block 5300), the system 1000 may de-select one or more targets based on visibility (Decision Block 5400). The criteria for such de-selection may include, but are not limited to:

The target is not currently visible.

Visibility+range: The target is not visible and would not be visible if it were moved a pre-determined distance towards the nearest point on the border of the visible range.

Visibility−range: The target is not visible or would not be visible if it were moved a pre-determined distance towards the nearest point on the border of the visible range.

In order to prevent rapid oscillation of targets between the selected and not-selected states, the system 1000 may provide buffering of targets' information (Action Block 5200 and 5500). The buffering may be done at the spectator grid 1100, the spectator client 1200, or at both the spectator grid 1100 and the spectator client 1200. The buffering may be based on, but are not limited to:

Buffering selection based on time: Buffering is triggered when a target that is not selected becomes selected by a selection algorithm (for example, an algorithm described above) (Action Block 5200). Instead of selecting the target, the target is instead flagged with a timer stating it may be selected after a pre-determined period of time (e.g., 5 seconds). Periodically, the target is evaluated by the selection algorithm. If the algorithm does not select the target, the timer is cleared. When the timer expires, the target is selected.

Buffering de-selection based on time: Buffering is triggered when a target that is selected becomes de-selected by a de-selection algorithm (for example, an algorithm described above) (Action Block 5500). Instead of de-selecting the target, the target is instead flagged with a timer stating it may be de-selected after a pre-determined period of time (e.g., 5 seconds). Periodically, the target is evaluated by the de-selection algorithm. If the algorithm does not de-select the target, the timer is cleared. When the timer expires, the target is de-selected.

Buffering selection based on distance: When selecting a target based on visibility and de-selecting a target based on visibility, as described above, range based buffering (Action Block 5200) is achieved by using a smaller range for selection than is used for de-selection.

Buffering de-selection based on distance: When selecting a target based on visibility and de-selecting a target based on visibility, as described above, range based buffering (Action Block 5500) is achieved by using a larger range for selection than is used for de-selection.

The above methods of buffering selection and/or de-selection may be combined to smooth the selection and/or de-selection.

When the system 1000 selects multiple targets for display, statistics may be displayed for all selected targets in aggregate. For example, the combined health of multiple selected targets may be displayed as a single number. Other methods for aggregation include, but not limited to:

Summation: The numerical value of each target is added, and the total is displayed. The total may be displayed as a bar (e.g., health bar 3110, 4110), a numerical value, and so on.

Proportional Summation: Each target is evaluated separately, and its statistic is converted to a percentage based on a maximum allowable range. The percentages are then summed. The resulting percentage is then displayed as a bar (e.g., health bar 3110, 4110), a numerical value, and so on.

Figure 10A:
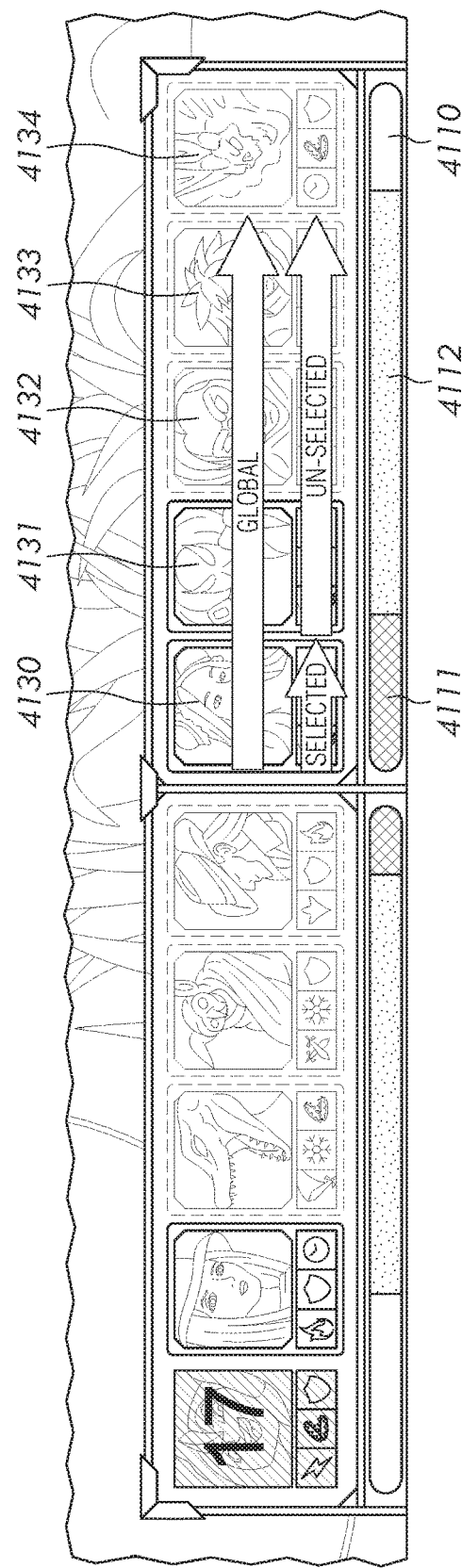
FIG. 10a is another user interface according to an embodiment of the present invention.

The system 1000 may present global and selected target information simultaneously. Global targets include all selected and un-selected targets. For example, turning back to FIG. 10, the health bar 4111 represents the health of the selected targets (e.g., nearby champions), the health bar 4112 represents the health of the un-selected targets (e.g., far champions). In the example of FIG. 10, as shown in FIG. 10a, the global targets include both the selected (e.g., nearby) champions 4130, 4131, and the un-selected (e.g., far) champions 4132, 4133, 4134. By superimposing the selected-target bar 4111 over the un-selected-target bar 4112, the spectator client 1200 may visually display all three states in a single combined bar.

As described above, statistics for global targets may be displayed using the summation or proportional summation method substituting global targets for selected targets. In the same manner, statistics for un-selected targets can be displayed using the summation or proportional summation method substituting un-selected targets for selected targets.

The difference in length between the global target bar (e.g., combination of health bar 4111 and health bar 4112) and the selected-target bar (e.g., health bar 4111) will be proportional to the length of the un-selected-target bar (e.g., health bar 4112), when the same methods and scale are used for both sets of targets. For example, the selected-target bar 4111 represents the proportional total health of the selected team members; the un-selected-target bar 4112 represents the proportional total health of the un-selected team members; the global bar is the proportional total health of global team members.

Various combinations of the above described methods of selection, de-selection and buffering may be used by the system 1000. For example, during a game session, the viewing area of the spectator's camera can be used for selection and de-selection with a time buffer for de-selection. A combined health bar for selected, de-selected, and global players can be displayed allowing for the overall health status of the team to be understood within the local (viewable), off-screen (unviewable) and global (aggregate total) contexts.

In an embodiment, the spectator client 1200 displays ceremony or celebration (not shown) when a big event occurs or is achieved in a game session. The big events include, for example:

Dragon Kill—This ceremony shows which team killed Dragon.

Baron Kill—This ceremony shows which team killed Baron.

Triumph—This ceremony shows which team won a fight, e.g., reduced the other team's health bar to zero.

Kill Streaks—This ceremony celebrates pentakills and possibly other kill streaks.

In another embodiment, the status bar 3100 and 4100 may be enabled for all players in a game session. In this embodiment, the spectator client may not display all information as that is displayed for spectator view because a player does not have an omnipresent view as a spectator does.

It is noted that the system 1000 may also be implemented in non-video game applications (e.g., online shopping system), or systems that can differentiate between visible and non-visible targets (e.g., augmented reality systems). For example, in a price checking system, when viewing products through an augmented reality device, products can be selected based on their visibility (using a selection method as described above, e.g., products cost less than $5, products on-sale, and so on) with a buffer to prevent quick selection (using a buffering method as described above). They can be de-selected when they are no longer visible (using a de-selection method as described above) with a buffer to prevent quick de-selection (using a buffering method as described above). The price of each individual item may be displayed up to a pre-defined limit. When too many items are selected, the aggregate price of all selected items may be displayed (using a combined statistics method as described above). This can be compared versus the aggregate price of all de-selected items.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for online gaming systems; however, the invention can be used for any multi-user online system in general, online shopping system in general, or systems that can differentiate between visible and non-visible targets (i.e. augmented reality systems). Additionally and obviously, features may be added or subtracted as desired. Accordingly, the invention is not to be restricted except in light of the attached claims and their equivalents.

What is claimed is:

1. An online multiuser game system, comprising:
an online game session server system communicatively coupled to a public network for access by a plurality of users to establish a plurality of real-time interactive games sessions;
a spectator server communicatively coupled to the online game session server system and configured to enable a user to view and time-shift at least one of the plurality of real-time interactive games sessions;
wherein the at least one of the plurality of real-time interactive games sessions includes a plurality of electronic avatars; and
wherein the spectator server is further configured to:
enable a user to select an avatar for the user's view to follow;
calculate an interest value associated with each of the plurality of avatars; and
not shift the user's view to another avatar having an interest value higher than the interest value associated with the avatar selected by the user unless one or more threshold values are exceeded.

2. The online multiuser game system of claim 1, wherein the spectator server is further configured to enable a directed view.

3. The online multiuser game system of claim 1, wherein time-shift includes a plurality of controls available to the user, including playback, pause, playback speed control, and jump to latest.

4. The online multiuser game system of claim 1, wherein the spectator server is further configured to present to the user active games most requested by other users and active games having most requested players.

5. The online multiuser game system of claim 1, wherein the one or more threshold values decay over time.

6. The online multiuser game system of claim 1,
wherein the spectator server is further configured to monitor an interest for a future event; and
wherein the spectator server is further configured to shift the user's view to the other avatar only when the interest for the future event is ramping up linearly.

7. The online multiuser game system of claim 1, wherein calculating the interest value uses a set of factors including proximity of other avatars within a virtual landscape; current health level; presence of debuffs; participation in one or more future events; interaction with terrain elements; avatar activities, or a combination thereof.

8. The online multiuser game system of claim 7, wherein the spectator server is further configured to display a team status bar.

9. The online multiuser game system of claim 8, wherein the team status bar includes a display of each of the avatars within the virtual landscape and a display of health of the each of the avatars.

10. The online multiuser game system of claim 9, wherein the display of health of avatars that are nearer to the user's view are differentiated from the display of health of avatars that are farther from the user's view.

11. The online multiuser game system of claim 9, wherein the display of avatars that are nearer to the user's view are differentiated from the display of avatars that are farther from the user's view.

12. The online multiuser game system of claim 8, wherein the spectator server is further configured to display one or more of the plurality of avatars in the team status bar based on a visibility status of the one or more of the plurality of the avatars.

13. The online multiuser game system of claim 12, wherein the spectator server is further configured to display information associated with the displayed one or more of the plurality of avatars in the team status bar based on the visibility status of the displayed one or more of the plurality of the avatars.

14. A non-transitory computer-usable medium having a sequence of instructions which, when executed by one or more processors, causes said one or more processors to execute a process for enabling a spectator's view for a multi-user online game system over a public network, said process comprising:
enabling access over the public network by a plurality of players to establish a plurality of real-time active interactive games sessions with the multi-user online game system; and
enabling a spectator to select, view, and time-shift at least one of the plurality of real-time active interactive games sessions, wherein the at least one of the plurality of real-time active interactive games sessions includes a plurality of electronic avatars;
wherein the process further comprises:
enabling a user to select an avatar for the user's view to follow;
calculating an interest value associated with each of the plurality of avatars; and
not shifting the user's view to another avatar having an interest value higher than the interest value associated with the avatar selected by the user unless one or more threshold values are exceeded.

15. The non-transitory computer-usable medium of claim 14, the process further comprising enabling a directed view of the selected real-time active interactive game session.

16. The non-transitory computer-usable medium of claim 14, wherein time-shift includes a plurality of controls available to the spectator, including playback, pause, and playback speed control, and jump to latest.

17. The non-transitory computer-usable medium of claim 14, wherein the process further comprises presenting to the spectator active games most requested by other spectators and active games having most requested players.

18. The non-transitory computer-usable medium of claim 14, wherein the one or more threshold values decay over time.

19. The non-transitory computer-usable medium of claim 14,
wherein the spectator server is further configured to monitor an interest for a future event; and
wherein the spectator server is further configured to shift the user's view to the other avatar only when the interest for the future event is ramping up linearly.

20. The non-transitory computer-usable medium of claim 14, wherein calculating the interest value uses a set of factors including proximity of other avatars within a virtual landscape; current health level; presence of debuffs; participation in one or more future events;
interaction with terrain elements; avatar activities, or a combination thereof.

21. The non-transitory computer-usable medium of claim 20, wherein the spectator server is further configured to display a team status bar.

22. The non-transitory computer-usable medium of claim 21, wherein the team status bar includes a display of each of the avatars within the virtual landscape and a display of health of the each of the avatars.

23. The non-transitory computer-usable medium of claim 22, wherein the display of health of avatars that are nearer to the user's view are differentiated from the display of health of avatars that are farther from the user's view.

24. The non-transitory computer-usable medium of claim 22, wherein the display of avatars that are nearer to the user's view are differentiated from the display of avatars that are farther from the user's view.

25. The non-transitory computer-usable medium of claim 21, wherein the spectator server is further configured to display one or more of the plurality of avatars in the team status bar based on a visibility status of the one or more of the plurality of the avatars.

26. The non-transitory computer-usable medium of claim 25, wherein the spectator server is further configured to display information associated with the displayed one or more of the plurality of avatars in the team status bar based on the visibility status of the displayed one or more of the plurality of the avatars.

27. A computer implemented method for matching players of an online multiuser game system, comprising:
   instructions stored in non-transitory computer readable memory that, when executed by one or more processors of the online multiuser game system, include the steps of:
      enabling the players to establish a plurality of real-time interactive game sessions with the online multiuser game system over a public network; and
      enabling at least one spectator to select, view, and time-shift at least one of the plurality of real-time interactive game sessions, wherein the spectator's view is graphically rendered from game data provided by the game system, wherein the at least one of the plurality of real-time interactive games sessions includes a plurality of electronic avatars;
      enabling a user to select an avatar for the user's view to follow;
      calculating an interest value associated with each of the plurality of avatars; and
      not shifting the user's view to another avatar having an interest value higher than the interest value associated with the avatar selected by the user unless one or more threshold values are exceeded.

* * * * *